Oct. 5, 1943.  A. W. KUMM  2,331,075
FLUID TRANSMISSION
Filed March 18, 1942   2 Sheets-Sheet 1
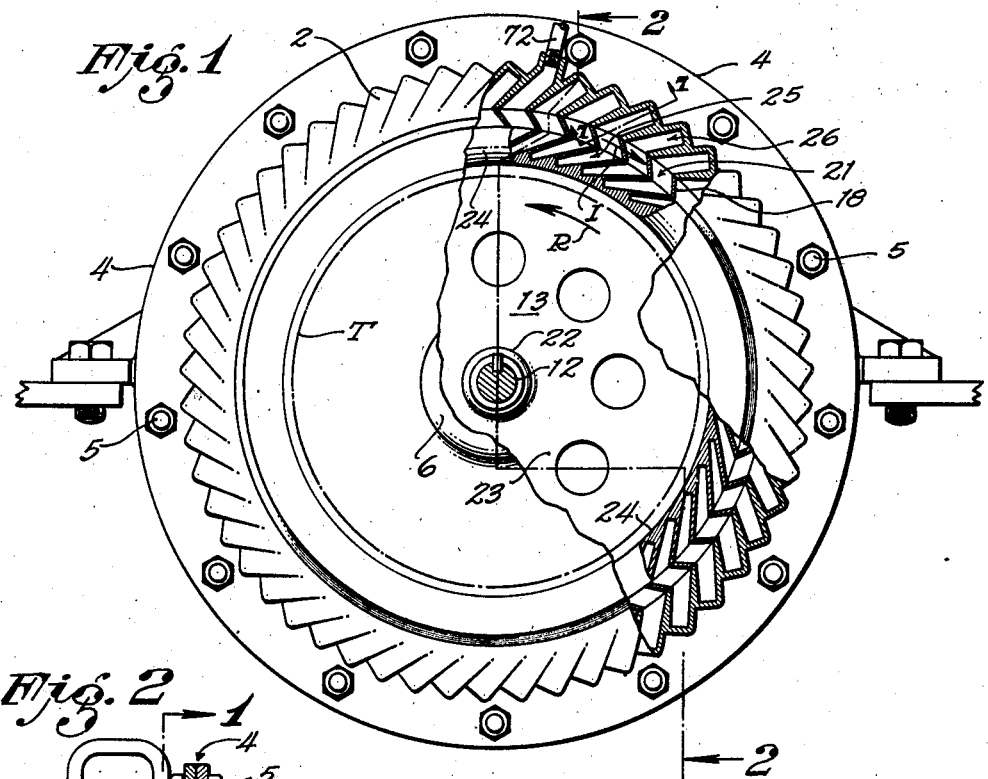
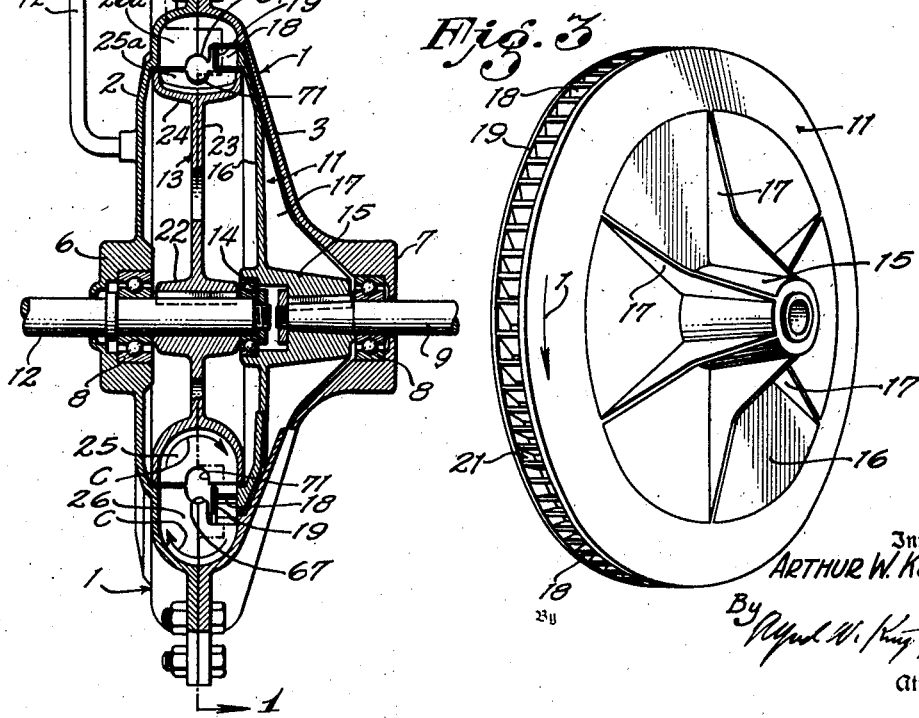
Inventor,
ARTHUR W. KUMM

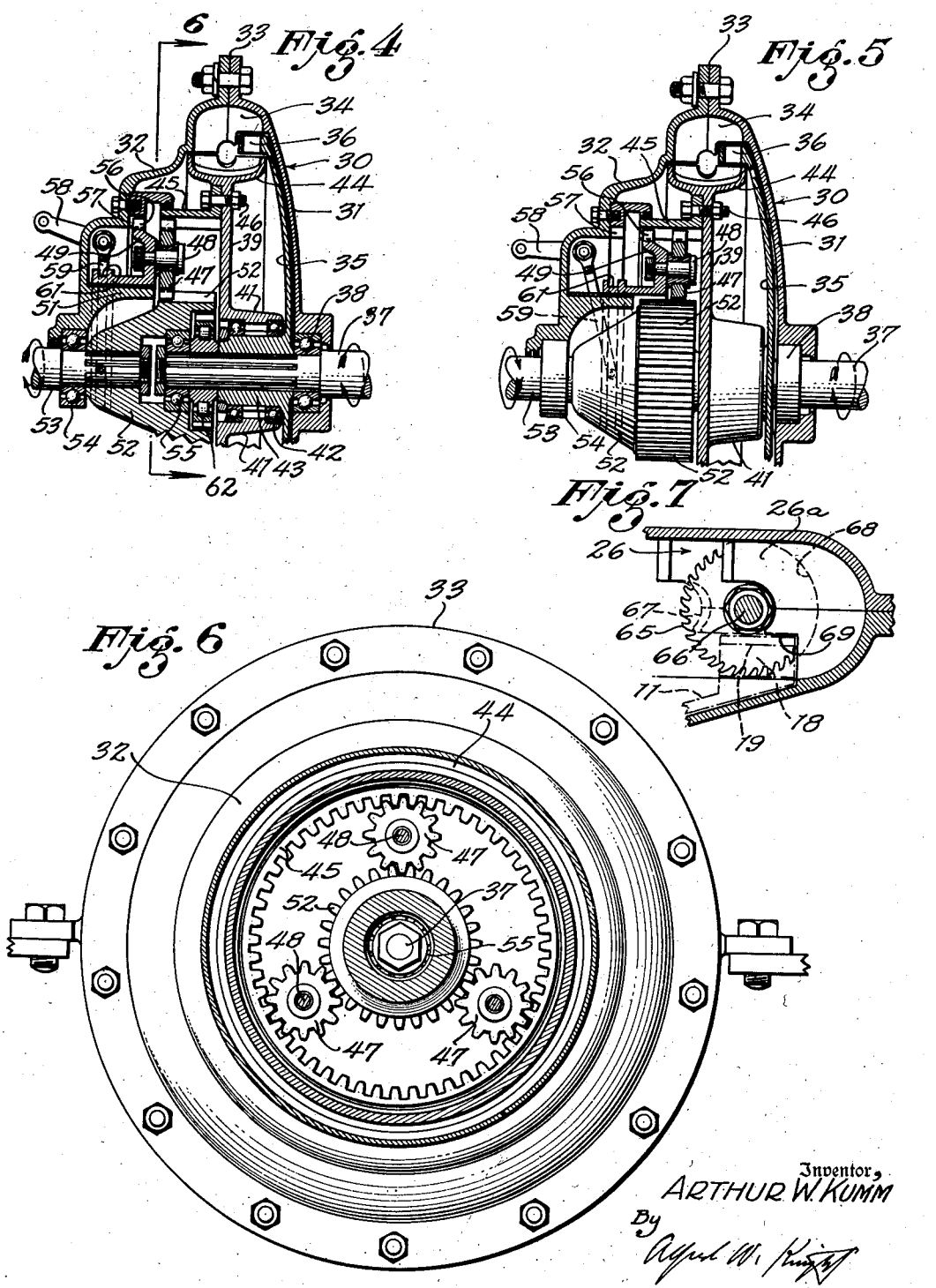

Patented Oct. 5, 1943

2,331,075

UNITED STATES PATENT OFFICE 2,331,075

FLUID TRANSMISSION

Arthur W. Kumm, Los Angeles, Calif.

Application March 18, 1942, Serial No. 435,122

8 Claims. (Cl. 74—189.5)

This invention relates to so-called "fluid transmissions," and pertains more particularly to a fluid drive device in which fluid inertial effects are applied substantially tangentially to a driven rotor member to produce the desired driving torque.

One of the particular objects of the invention is to provide a fluid transmission in which fluid circulation is established in a plurality of confined spaces lying in a circumferentially inclined relation, wherefore inertial effects resulting from the established circulation are caused to be directed against such rotor in a highly efficient manner.

A further object of the invention is to provide a device of the character described, in which the driven rotor and the driving impeller are caused to move in opposite directions.

A further object of the invention is to provide a fluid transmission which exhibits a minimum drag on the driving impeller when the driven rotor is held immobile, wherefore the prime mover may be allowed to "idle" when no motion of the driven member is desired.

A further object of the invention is to provide a fluid transmission combined with an improved form of planetary reversal assembly, useful in automobile constructions.

With the foregoing and other objects in view, which will appear as the description proceeds, the invention resides in the novel construction, combination and arrangement of parts herein specifically described and illustrated in the accompanying drawings, but it is to be understood that the latter are merely illustrative of certain embodiments of the invention, and that the actual needs of practice and manufacture may require certain mechanical variations from the embodiments shown. It is, therefore, not intended to limit the invention to the disclosure thereof herein illustrated, but rather to the scope of the subjoined claims.

Referring to the drawings, in which like parts are designated by like numerals and reference characters:

Fig. 1 is a partly broken-away end elevation of a fluid transmission incorporating my invention, as taken on line 1—1 in Fig. 2;

Fig. 2 is a longitudinal section thereof, as taken on line 2—2 in Fig. 1;

Fig. 3 is a three-quarter view of the impeller member, or runner, utilized in the construction;

Fig. 4 is a partly broken-away longitudinal section of a modified construction incorporating my invention, showing the position adopted by certain parts when the transmission is functioning as a reversing gear;

Fig. 5 is a view corresponding to Fig. 4, showing the parts positioned for direct drive;

Fig. 6 is a transverse section taken on line 6—6 in Fig. 4; and

Fig. 7 is a fragmentary view as taken on line 7—7, in Fig. 1, illustrating a milling procedure which may be followed in forming the bucket structure in a portion of the device.

Referring to Figs. 1 to 3 of the drawings, the device of the present invention may comprise a generally circular housing 1, formed of two axially abutting complementary housing portions 2 and 3 intersecured at a fluid-tight peripheral flange-portion 4 through the agency of bolts or the like 5. The respective axial ends of the housing 1 carry axially aligned bearing members 6 and 7, suitably provided with ball-bearings or the like 8. A drive shaft 9 extends through bearing members 7 in the housing portion 3, and fixed to the inner end of the drive shaft is an impeller or runner 11 (shown in detail in Fig. 3). A driven shaft 12 extends through bearing member 6 in the housing portion 2, and fixed to the inner end thereof is a rotor member 13. The inner end of the shaft 12 is preferably provided with a pilot bearing 14 such as a ball bearing, which may be carried by the hub portion 15 of the runner 11 at the inner end thereof.

The runner 11 is substantially disc-shaped, comprising a disc portion 16 mounted upon or formed integrally with the hub portion 15, and reinforced with respect thereto through the agency of a plurality of radial web portions 17. At the periphery of the portion 16 I provide a plurality of impeller blades 18 which are preferably inclined forward and inward with respect to the direction of rotation of the impeller (as indicated by the arrow "I"). At the axial ends of the blade 18 I preferably provide a ring 19, which serves a dual purpose as a stiffener for the blades 18 and as a member which will provide a plurality of generally radial ducts 21 between the plurality of blades 18.

The rotor 13 may comprise a hub portion 22 which is keyed or otherwise secured to the inner end of the driven shaft 12, a web portion 23, and a rim portion 24. In the specific construction illustrated, the rim portion 24 is provided with a plurality of circumferentially spaced buckets 25, said buckets having fixed walls throughout, and being of generally semi-circular shape on their medial plane, and being arranged in an outward and rearward inclined relation (with respect to the direction of rotation R of the rotor 13). The respective buckets 25 are arranged in a plurality of circumferentially spaced planes parallel to the axis of rotation of the rotor, each of which planes is substantially tangent to a circle "T" which preferably has a radius approximately 0.8 that of the rotor 13.

This inclines the medial plane of each bucket at a highly oblique angle to the direction of a tangent to the periphery of the rotor, and outwardly and forwardly in the direction of rotation of the impeller 11. A very desirable effect results from this in the operation of the rotor buckets 25 of the rotor, because it causes the stream at the moment of delivery to the blades of the impeller from the buckets 25 to be moving in a rearward direction relative the periphery of the rotor. This of course reduces the absolute velocity of this stream when the rotor is in motion. Consequently the rapidly moving blades 18 of the impeller cut across this stream without obstructing it. Hence no retarding of this stream with consequent eddy currents can occur. In other words, while the driving face of each blade 18 is accelerating the stream, the rear face of the blade is actually moving away from the outwardly flowing stream. Naturally then there can be no regurgitation or eddy currents developed. The blades 18 are preferably nearly flat and placed at an angle such that they are disposed nearly at right angles to the medial plane of each bucket 25 as the blade passes the same (see Fig. 1).

The blades 18 may conveniently be equal in number to the number of buckets 25 plus one, as shown in Fig. 1, and are only slightly curved. They preferably substantially conform to an involute of the circle T. The length of the blades 18 along their curvature may conveniently be equal to or slightly in excess of a length such as to span the depth of the buckets 25 (as measured perpendicular to the bucket-plane at the periphery of the bucketed rim 23).

The housing 1 of the specific construction illustrated may also comprise a stator member defined by a plurality of reversing buckets or guide buckets 26 arranged in a plurality of circumferentially spaced planes each lying parallel to the axis of rotation of the rotor member and generally tangent to the circle T, in such manner as to be inclined outward and rearward with respect to such rotation, as substantial complements to the respective buckets 25, and directed oppositely thereto. The stator buckets 26 are thus inclined outwardly and forwardly in the direction of rotation of the impeller 11, and are directed in substantial alinement with the rotor buckets 25. The appearance of the complementary buckets 25 and 26, taken in the plane thereof, is best illustrated at the bottom portion of Fig. 2, from which figure it will be observed that the blades 18 in the impeller 11 are disposed within the configuration of but wholly at one axial side of the bucket structure with respect to the medial plane of rotation of the rotor buckets 25. This relation is established in order to secure an outward circulation of the energy-transmitting fluid (such as a light oil, which is provided within the housing 1) at the position of the blades 18, which circulation is directed outward against the direction-changing buckets 26 in the stator, thence inward into the reaction buckets 25 in the rotor, producing the desired thrust upon such rotor as the direction of the fluid is again reversed through 180° and brought back in position to be acted upon by the runner blades 18. This circulation is indicated by the arrows "C" in Fig. 2. The thrust thus exerted on the rotor tends to cause rotation thereof in the direction R, opposite to the direction of rotation of the impeller.

It will be appreciated that when the rotor 13 is held at rest, as when the vehicle is stationary, all that is required of the impeller 11 is that of overcoming the velocity losses in the energy-transmitting fluid resulting from friction, wherefore the prime mover may be allowed to "idle" without being overloaded. When the rotor is allowed to move, the impeller blades are called upon to do more work in accelerating the fluid circulation, and the torque demand on the impeller is increased.

In Figs. 4 to 6 I have illustrated a fluid transmission provided with a high speed direct drive and a low speed reversing gear. A housing is provided at 30, comprising a forward housing portion 31 and a rearward housing portion 32 interconnected peripherally by a fluid-tight mating flange structure 33. The housing portions 31 and 32 are provided with a reversing bucket structure 34, and an impeller or runner is provided as at 35 having a blade structure 36 comparable to the structure 18—19 above. The runner 35 is rotatively fixed to a drive shaft 37 which extends through the forward housing portion 31 and is rotatively mounted therein as through a ball bearing 38.

The rotor 39 is provided with a hub portion 41 rotatively mounted as at 42 on a rearward projecting hub member 43 secured to or formed integrally with the impeller 35. The rotor 39 is further provided with a peripheral bucket structure 44 which may correspond to the bucket structure 25 above.

An internal ring or bell gear 45 is secured to the rearward side of the rotor, as by bolts 46, which meshes with a plurality of planetary gears 47, pivotally mounted as at 48 on a ring member 49 which is rotatively and slidably mounted on a cylindrical member 51 secured to or formed as a part of the rearward housing member 32. The planetary gears 47 mesh with a sun gear 52 which is rotatively secured to a rearward extending driven shaft 53 rotatively mounted in the housing portion 32 as at 54. The forward end of the sun gear 52 may be provided with a piloting bearing 55, mounted on the inner end of the shaft 37.

The ring 49 is provided with an external toothed portion 56 adapted to mesh with the bell gear 45 in the position shown in Fig. 5, and an internal toothed member 57 is provided on the rearward housing portion 32 in position to mesh with the toothed portion 56 when the member 49 is in the position shown in Fig. 4. A suitable lever 58, pivoted to the housing portion 32, and carrying a yoke 59 engaging a groove 61 in the member 49 may be provided to shift the member 49 between the illustrated positions.

In the position shown in Fig. 5, a rotation of the shaft 37 in the direction shown will induce an opposite rotation of the rotor 39. This latter rotation is communicated directly to the bell gear 45, thence through the ring 49 and the planetary gears 47 to the sun gear 52, causing the shaft 53 to rotate in the same direction and at the same speed as the rotor 39. When the ring 49 is shifted to the position shown in Fig. 4, the axes of rotation of the gears 47 will be fixed against rotation about the axis of the shafts 37 and 53, and the rotation of the rotor 39 and the bell gear 45 will cause a contrariwise rotation of the sun gear 52 through the planetary gears 47. The shafts 37 and 53 will thus rotate in the same direction, with the shaft 53 being driven at a greater speed than the rotor 39 (the ratio of speeds being inversely related to the ratio of diameters of the gears 45 and 52).

In the position shown in Fig. 5, the shaft 53 will be driven at one-half the speed of the shaft 37, and in the opposite direction; in the position of Fig. 4 the shaft 53 will be driven at the same speed, and in the same direction as the shaft 37. Fig. 4 may be considered the "direct drive" position, and Fig. 5 may be considered the "reverse" position. If desired, an overrunning clutch member 62 may be provided between the sun gear 52 and the inner end of the shaft 37 to prevent the sun gear 52 from overrunning the shaft 37, which will provide for effective "compression" braking in the "direct drive" condition, for automobile operation.

Fig. 7 is a sectional detail as would be taken on line 7—7 in Fig. 1, illustrating a manner of forming the buckets 26 which are shown as provided in the housing 1 of the specific construction illustrated. A milling cutter 65 carried on a spindle 66 is moved outward into the housing on a plane tangent to the circle "T" (Fig. 1), and the center portion of the partition 26a between the respective buckets 26 is cut away as at 67 to enable the spindle 66 to pass outward a sufficient distance to cause the cutter 65 to cut the outer end wall 68 of the bucket 26 at the correct position. In Fig. 7 I have also shown (in dot-dash lines) the relative position of the impeller blades 18 with respect to a bucket 26, and it may be noted that the bucket wall is cut away as at 69 so that the blades 18 of the impeller are located wholly outward of the rotor 13. It will be apparent that the buckets 25 may be formed in the rotor 13 in the same manner, the bucket partition 25a being cut away as shown at 71 in Fig. 2.

In Figs. 1 and 2 I have shown a vent line 72 interconnecting the outer portion of one of the buckets 26 in the stator 1 with a point of the interior of the housing, preferably inward of the rim portion 24 of the rotor 13. This vent line will serve to scavenge entrapped air and return it to the interior of the housing, during operation of the device.

It will be appreciated that while I have illustrated the stator 1 and the rotor 13 as being provided with the same number of reversing buckets 26 and 25, any desired number of these buckets may be provided in either member, without departing from the concept of this invention.

I claim:

1. In a fluid transmission, the combination of a stator, a rotor mounted coaxially within the same with its periphery spaced from the inner periphery of the stator at one side of the medial plane of rotation of the rotor, an annular impeller with blades, mounted in the space between the said peripheries of the stator and rotor, and located wholly on one side of the medial plane of the rotor, said rotor having spaced reaction buckets with fixed walls extending inwardly from its periphery, each bucket disposed so that its medial plane inclines outwardly and forwardly in the direction of rotation of the impeller at a highly oblique angle to the tangent line at the periphery of the rotor, whereby the outflowing stream in each bucket moves in a general rearward direction with respect to the direction of movement of the periphery of the rotor, thereby reducing the absolute velocity of the said outflowing stream; said impeller being driven in the opposite direction to the rotor, and said impeller blades being inclined to a radial line and operating to accelerate the said absolute velocity of said outflowing stream toward the stator, said stator having guide buckets for directing each outflowing stream back into the rotor buckets on the other side of the medial plane of the rotor.

2. A fluid transmission constructed as defined in claim 1 in which the guide buckets of the stator are inclined outwardly and forwardly in the direction of rotation of the impeller at substantially the same inclination as the reaction buckets of the rotor.

3. A fluid transmission constructed as defined in claim 1 in which the blades of the impeller are placed and curved so as to conform to an involute curve evolved from a circle having a diameter of substantially eight-tenths the diameter of the rotor.

4. A fluid transmission, which comprises: a housing member defining an annular stator; a rotor member in said housing member, said rotor member being concentrically disposed with respect to said stator and rotatable therewithin; an impeller member mounted within said housing for rotation coaxially with said rotor member, said impeller member being provided with a plurality of circumferentially spaced blade members disposed radially outwardly of said rotor member, said rotor member and said stator being provided with a plurality of respectively outwardly and inwardly facing buckets, the medial plane of each bucket in each of said last-named elements being inclined outwardly and forwardly in the direction of rotation of the impeller member and at an angle to the tangent line to the rotor member at the location of the bucket, and said blade member of said impeller member being located wholly at one side of the medial plane of rotation of the buckets of said rotor member and being positioned to receive fluid from said last-mentioned buckets and shaped to impel such fluid outwardly into the buckets of said stator upon rotation of said impeller member.

5. A fluid transmission constructed as defined in claim 4, in which the buckets of both said rotor member and said stator are substantially tangent to a circle of somewhat smaller diameter than the rotor member, whereby the buckets of the stator are directed in substantial alinement with the buckets of the rotor member.

6. A fluid transmission constructed as defined in claim 4, in which the blade members of said impeller member are formed as involutes of a circle of smaller diameter than the rotor member and are inclined inwardly and forwardly in the direction of rotation of the impeller.

7. A fluid transmission which comprises: a housing member defining an annular stator; a rotor member rotatively mounted within said housing concentrically with respect to said annular stator, said stator and rotor member being provided with a plurality of bucket means disposed in coacting relationship, the bucket means in said stator member comprising a plurality of generally semi-circular inwardly facing flat bucket-shaped recesses arranged in a corresponding plurality of circumferentially spaced planes each lying substantially parallel to the axis of rotation of said rotor member, and each of which is substantially tangent to a circle defined by said rotor member and having a diameter approximately 0.8 that of said rotor member, and the bucket means in said rotor member comprising a plurality of generally semi-circular outwardly facing flat bucket-shaped recesses arranged in a corresponding plurality of circumferentially spaced planes each lying substantially parallel to the axis of said rotor member and each of which is substantially tangent to said circle, the bucket means in both said stator and said rotor member being inclined in the same absolute circumferential direction; an impeller member rotatably mounted in said housing, concentric with said rotor member, said impeller member being provided with a plurality of circumferentially spaced blade members located wholly at one side of the medial plane of rotation and radially outwardly of said rotor member and in closely spaced relation to the periphery of said member, and said stator member being provided with an annular recess at its inner circumference adapted to receive said blade members, said blade members being positioned to receive fluid from the bucket means and shaped to impel such fluid outwardly into the bucket means of said stator upon rotation of said impeller in said circumferential direction.

8. In a fluid transmission comprising a housing member, a rotor member in said housing member concentrically disposed with respect thereto and rotatable therewithin, and an impeller member mounted within said housing for rotation coaxially with said rotor member, a reversing arrangement which comprises: internal gear means mounted on said rotor member for rotation therewith; cylindrical bearing means adjacent said rotor member and coaxial therewith; a planetary gear support member rotatably mounted on said bearing means and adapted for longitudinal sliding movement between two axially spaced positions; a plurality of planetary gears pivotally mounted on said gear support in angularly spaced relation and meshing with said internal gear; a sun gear arranged coaxially with said rotor and meshing with said planetary gears; cooperating detent means on said gear support and said housing adapted for engagement when said gear support is in one of said two axially spaced positions, said detent means on said gear support being adapted to disengage its cooperating detent means on said housing and engage said internal gear when said gear support is in the other of said two axially spaced positions; means engaging said gear support to cause longitudinal movement thereof between said two positions; said impeller being mounted upon an axially extending drive shaft extending inwardly of said housing past said rotor member and being provided with pilot bearing means at its axially inner end for the sun gear whereby said sun gear is journaled on said drive shaft; and an overrunning clutch member operatively associated with said sun gear and said drive shaft and adapted for driving engagement of said drive shaft upon relative rotation of said sun gear at a speed greater than that of said drive shaft.

ARTHUR W. KUMM.